June 19, 1951 R. W. JONES 2,557,382

TELEPHONE SYSTEM EMPLOYING NONNUMERICAL SWITCHES FOR EXTENDING CALLING LINES TO NUMERICAL SWITCHES OR TO OPERATOR-CONTROLLED SWITCHBOARD

Filed Oct. 18, 1947 4 Sheets-Sheet 1

INVENTOR.
ROY W. JONES

BY Chas. W. Candy

ATTORNEY

INVENTOR.
ROY W. JONES
BY
Chas. W. Candy
ATTORNEY

June 19, 1951 R. W. JONES 2,557,382

TELEPHONE SYSTEM EMPLOYING NONNUMERICAL SWITCHES FOR EXTENDING CALLING LINES TO NUMERICAL SWITCHES OR TO OPERATOR-CONTROLLED SWITCHBOARD

Filed Oct. 18, 1947 4 Sheets-Sheet 3

*INVENTOR.*
ROY W. JONES

BY

ATTORNEY

June 19, 1951 R. W. JONES 2,557,382

TELEPHONE SYSTEM EMPLOYING NONNUMERICAL SWITCHES FOR EXTENDING CALLING LINES TO NUMERICAL SWITCHES OR TO OPERATOR-CONTROLLED SWITCHBOARD

Filed Oct. 18, 1947 4 Sheets-Sheet 4

INVENTOR.
ROY W. JONES

BY

ATTORNEY

Patented June 19, 1951

2,557,382

UNITED STATES PATENT OFFICE 2,557,382

TELEPHONE SYSTEM EMPLOYING NON-NUMERICAL SWITCHES FOR EXTENDING CALLING LINES TO NUMERICAL SWITCHES OR TO OPERATOR-CONTROLLED SWITCHBOARD

Roy W. Jones, Rochester, N. Y., assignor to Automatic Electric Laboratories, Inc., Chicago, Ill., a corporation of Delaware Application October 18, 1947, Serial No. 780,614

15 Claims. (Cl. 179—18)

The present invention relates in general to automatic and semi-automatic telephone systems, and more particularly to systems employing non-numerical switches for extending calling lines to numerical switches or to operator-controlled switchboards.

It is an object of the invention to provide in telephone systems of the characters described, new and novel circuit means for accomplishing the various telephone connections.

Another object of the invention is to provide in telephone systems of the characters described, novel and efficient non-numerical switches which are used as lineswitches for extending outgoing calls from line circuits associated with the line-switches.

A further object of the invention is to provide in telephone systems of the characters described, non-numerical switches which incorporate trunk connecting means in a new and novel manner for connecting the non-numerical switches to outgoing trunks.

A still further object of the invention is to provide in telephone systems of the characters described, new and novel arrangements whereby the trunks outgoing from two groups of line equipments are "graded" to form a combination of first-choice trunks individual to each group of line equipments and multiple trunks common to both groups of line equipments as secondary choices.

Another object of the invention is to provide in telephone systems of the characters described, novel circuit means for preventing "double" connections in a group of non-numerical switches.

Another object of the invention is to provide in telephone systems of the characters described, an improved line circuit arrangement employing a quick-to-restore line relay and novel circuit means whereby the line relay is permitted to restore immediately the line circuit is connected to a trunk extending therefrom.

A feature of the invention resides in the arrangement wherein connecting means individual to a non-numerical switch and common to the trunks serving the switch is operated by the cut-off relay of the switch to connect the switch to one of the said trunks only after an operation of the associated line relay has prepared, or conditioned, the cut-off relay for such action.

Another feature of the invention is the provision in a group of non-numerical switches wherein a chain circuit common to the line relays of the switches is effective to cause the line relays associated with simultaneously calling lines to operate in sequential order, of new and novel circuit means independent of any control by said chain circuit for causing the immediate re-operation of the line relay associated with a calling line which fails to start dialing within a prescribed time interval after having been extended through its non-numerical switch to a numerical switch, the re-operation of the last mentioned line relay causing its associated non-numerical switch to be placed in a locked out position.

Another feature of the invention concerns an improved chain circuit arrangement in a group of switches wherein a chain circuit for controlling the sequential connecting of switches to outgoing trunks on simultaneous outgoing calls is common to the cut-off relays instead of to the line relays, contacts on the line relays rendering the chain circuit normally ineffective.

A further feature of the invention relates to the employment of new and novel means for always automatically pre-assigning a trunk which is "individual" to a group of line circuit equipments, when the trunks outgoing from the group of line circuit equipments are "graded," whenever the individual trunk becomes free regardless of whether the trunk is next in numerical sequence for pre-assignment.

An additional feature of the invention concerns the novel arrangement of connecting means individual to each of the non-numerical switches in a group with respect to the trunks serving the group, whereby all of the connecting means are so conditioned by the pre-assignment of any trunk that any one of the switches can thereafter be caused to operate the connecting means individual to that particular switch for connecting the switch to the pre-assigned trunk.

There are other objects and features of the invention having to do for the most part with the circuit details necessary to carry out the objects and features above enumerated. The various objects and features of the invention will be understood best from a perusal of the following description of the drawings comprising Figures 1 to 7 inclusive, which show by means of trunking and circuit diagrams a sufficient amount of apparatus to enable the invention to be described and understood.

Figure 5:
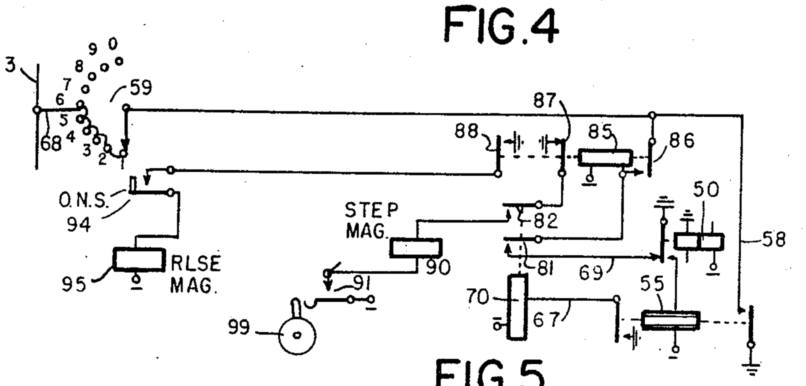

Figure 5 shows, in simple form, time limit control facilities for "timing out" and disconnecting an outgoing call whereon dialing is not started within a prescribed time interval after having been extended to a numerical switch.

Figure 6:
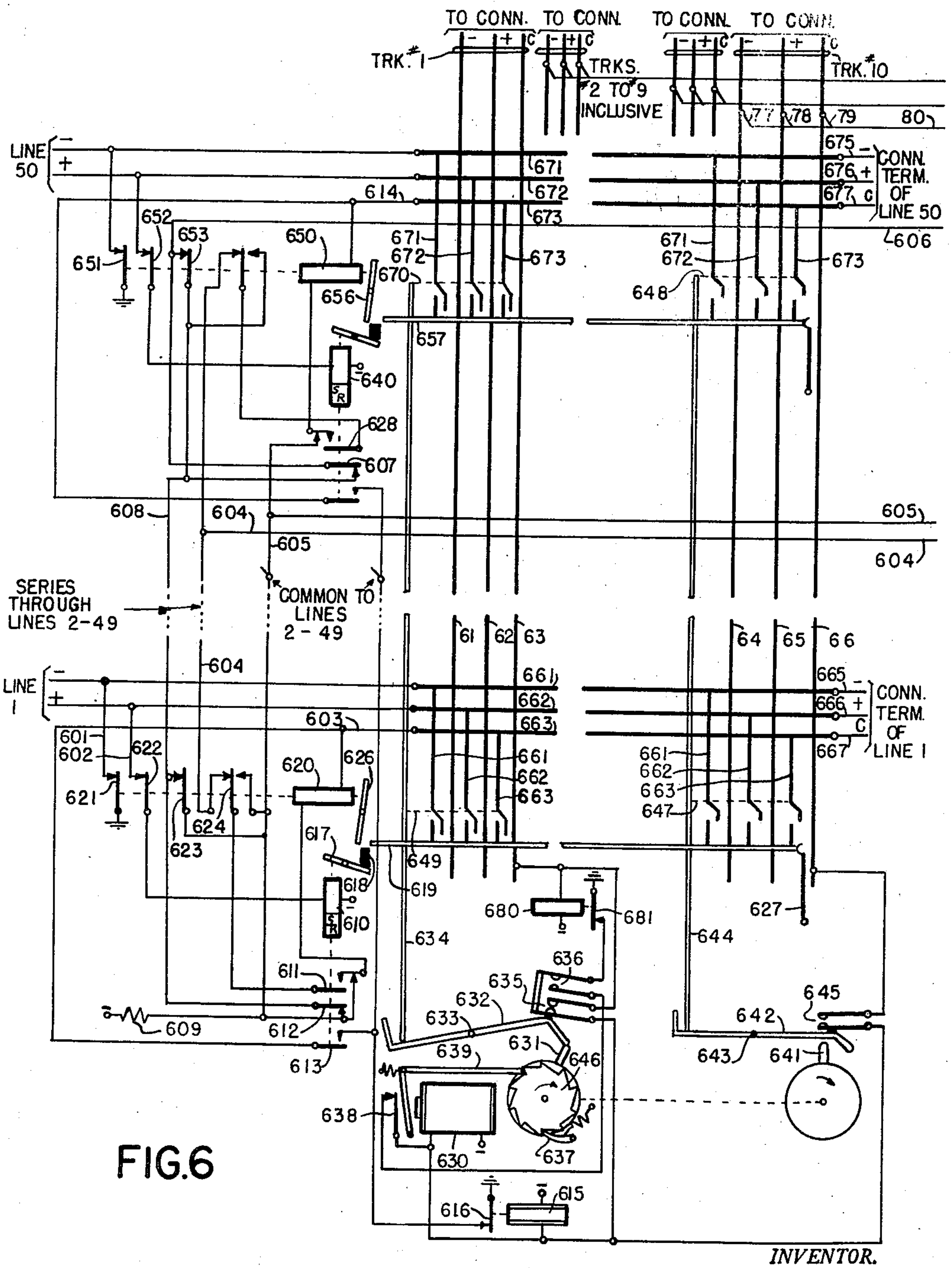
Figure 7:
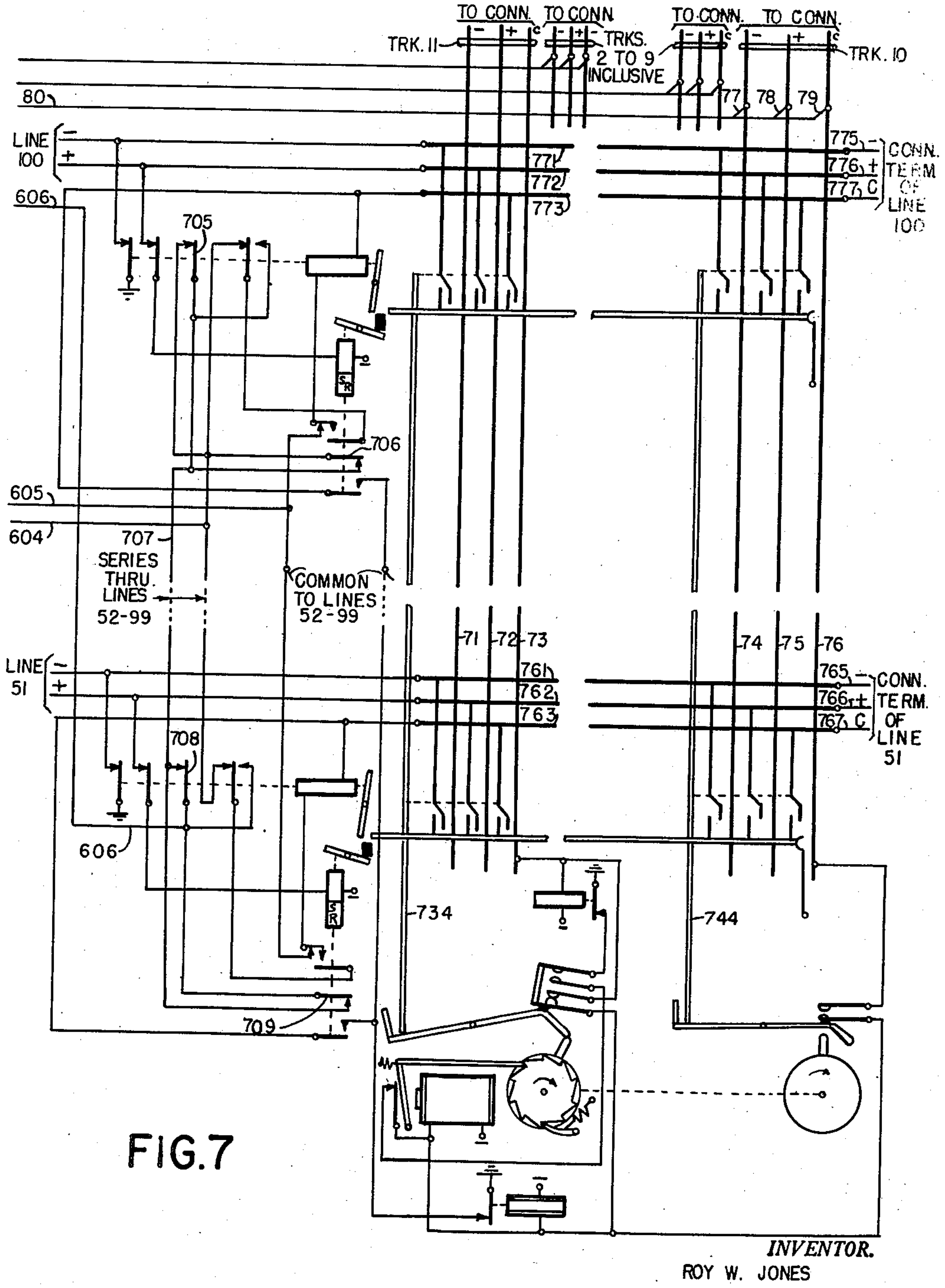

Figures 6 and 7 taken together show the circuit arrangements of a plan wherein 100 line equipments, divided into two subgroups of 50 line equipments each, are served by "graded" trunks comprising two individual and nine common trunks.

Figure 1:
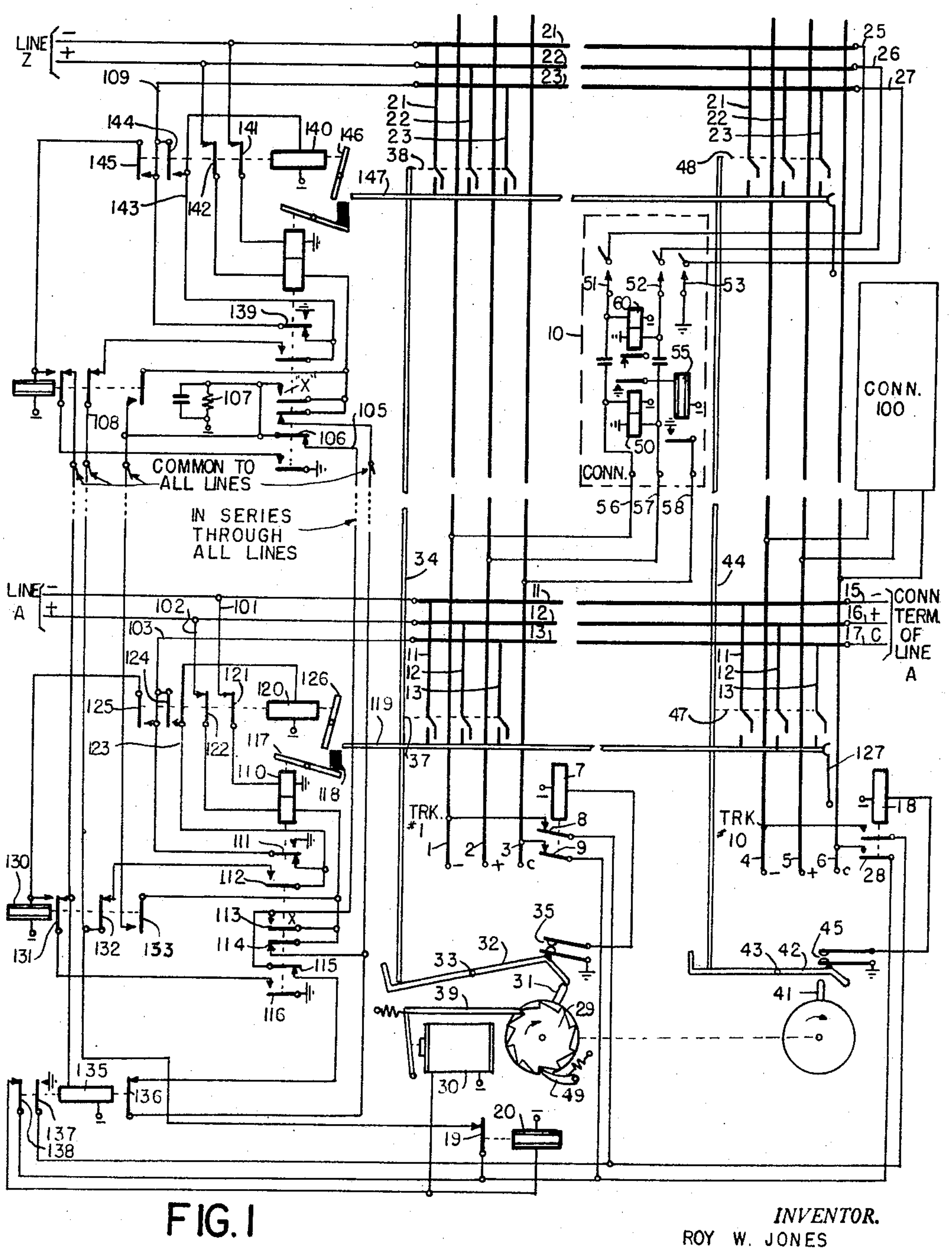
Figure 1 shows a plan whereby any number of lines may have access to any number of outgoing trunks.

Referring particularly to Figures 1, 6 and 7, the non-numerical switches, the trunk connecting means, and the common control trunk pre-assigning means are of the mechanical arrangement shown and described in detail in the Patent No. 2,541,354, issued February 13, 1951, to K. W. Graybill, with the general exception that the electromagnet for operating the common control trunk pre-assigning means is equipped with an armature-operated pawl for advancing the common cam shaft upon the energization of the electromagnet, whereas in the structure shown and described in Patent No. 2,541,354 the operation of the electromagnet tensions a spring which drives the common cam shaft upon the de-energization of the electromagnet. The connector switch shown in Figure 1 is of the well-known Strowger switch mechanism type having vertical and rotary movement, although any well-known type of switch may be employed with the present invention. Associated with the mechanical arrangements shown in Figures 1, 6 and 7 are sufficient circuit details for completing the trunking plans involved therein.

The time limit control switch shown in Figure 5 is of the well-known minor step-by-step type, and comprises a single set of bank contacts, a wiper associated with the bank contact set, means comprising a stepping magnet and a ratchet and pawl mechanism (not shown) for driving the wiper over the bank contacts, an off-normal contact spring set which is operated when the wiper is advanced from the first bank contact, and means comprising a release magnet for causing the wiper to be returned to the normal position (first bank contact). It should be understood, however, that the time limit control switch need not be exactly as shown, as any well-known timing device method may be employed.

The relays, resistors and condensers shown in Figures 1, 5, 6 and 7 are typical apparatus units used in telephone systems, and may be of any well-known type.

It should be understood at this time that while a plurality of battery connections are shown in the drawings, they are preferably the same battery. Also, in order to simplify the drawings further, such well-known facilities as busy keys, jacks for enabling an attendant to plug into the various switches, spark quenching apparatus, ringing and tone generating equipment, and the like have been omitted.

Having described the equipment and apparatus, a detailed description of the operation will now be given.

*Outgoing trunking operation*

In the circuit diagram of Figure 1 are shown two lines and two trunks designated line A, line Z, trunk 1 and trunk 10 respectively. The vertical conductors in the diagram between lines A and Z are broken to indicate that any desired number of lines (dependent upon the grade of service to be rendered) may be interposed between lines A and Z. Similarly, the horizontal conductors between trunks 1 and 10 are broken to indicate that trunks 2 to 9 may be included. It should be understood, however, that the number of trunks need not be exactly ten but may be more or less according to desire or the amount of traffic offered by the total number of lines. The lines may be equipped with telephone instruments of any well-known manual or automatic type, according to the kind of subscriber service it is intended to provide, or the lines may be connected to suitable equipment on an operator-controlled switchboard to care for service from and to such a manual switchboard. The trunks may terminate in automatic switches of any well-known type for providing outgoing service from the lines, or the trunks may terminate in an operator-controlled switchboard in order that outgoing calls initiated on the lines may be completed by operators. For the purpose of this explanation it is assumed that the lines are equipped with telephone instruments of the automatic dial type, and that the trunks terminate in connector switches of the well-known Strowger type.

In addition to the lines and trunks shown in Figure 1, a sufficient amount of mechanical parts of the invention covered by Patent No. 2,541,354 are included in the diagram to make the explanation more readily understandable, but these mechanical parts are shown in diagrammatic form rather than in elevation in order to reduce Figure 1 to its simplest form. Only general explanation of these mechanical parts and their operations will be given in this specification, as reference may be had to the aforementioned Patent No. 2,541,354 for a complete understanding of the inter-relationship of these mechanical parts and their operations.

Referring now to Figure 1, bare wire conductors 1, 2 and 3 are supported in a vertical plane and are connected to trunk 1, and in a similar manner bare wire conductors 4, 5 and 6 are connected to trunk 10. As in the case of the exact number of trunks, the number of vertical bare wire conductors connected to each trunk need not be exactly three but may be more or less as the circumstances require. In addition to being connected to trunk 1, vertical conductors 1, 2 and 3 are connected by means of conductors 56, 57 and 58 to connector switch 10, and similarly vertical conductors 4, 5 and 6 are connected to connector switch 100. Connectors 10 and 100 may be of any of the well-known Strowger connector switch designs according to circumstance and, therefore, it is considered satisfactory to include herein only enough of the connector to properly complete this circuit explanation.

Line A is connected to conductors 101 and 102 leading to the resting contacts of armatures 121 and 122 respectively of a line circuit and also to the horizontally disposed line equipment conductors 11 and 12. In a similar manner, line Z is connected to another line circuit and to the horizontally disposed line equipment conductors 21 and 22. The connector terminals of line A (over which calls outgoing to line A are completed) are connected to conductors 15, 16 and 17 leading to line equipment conductors 11, 12 and 13 respectively, and in a similar manner the connector terminals of line Z are connected to conductors 25, 26 and 27 leading to line equipment conductors 21, 22 and 23 respectively.

Each horizontally disposed line equipment conductor such as 11 has a vertically disposed member depending therefrom for each of trunks 1 and 10. The left-hand vertically disposed depending member 11 is associated with bare wire conductor 1 of trunk 1, and the right-hand depending member 11 with bare wire conductor 4 of trunk 10. In a similar manner there are vertically disposed depending members from conductors 12, 13, 21, 22 and 23 associated with bare wire conductors of trunks 1 and 10. The lower, or free, ends of the left-hand vertical members 11, 12 and 13 are close to but clear of the related conductors 1, 2 and 3 of trunk 1, and are arranged for being pressed into electrical contact with conductors 1, 2 and 3 thereby to connect line A with trunk 1, and in a similar manner the free ends of right-hand vertical members 11, 12 and 13 are arranged for being pressed into contact with conductors 4, 5 and 6 thereby to connect line A with trunk 10. The free ends of vertical members 21, 22 and 23 are also arranged for being pressed into contact with either conductors 1, 2 and 3 of trunk 1 or conductors 4, 5 and 6 of trunk 10 thereby to connect line Z with trunk 1 or trunk 10 as the case may be. In Figure 1, the means for connecting vertical members 11, 12 and 13 to the conductors of either trunk 1 or trunk 10 is represented in simple diagrammatic form by the horizontal plate 119 and its six vertical arms, and in a similar manner the means for connecting vertical members 21, 22 and 23 to the conductors of either trunk 1 or trunk 10 is represented by the horizontal plate 147 and the associated six vertical arms.

When a trunk is in the idle position, no set of vertical depending members associated with that trunk can be pressed into contact with the conductors of that trunk and, consequently, no line circuit having access to that trunk can be connected to the trunk under such conditions. For example, trunk 10 is shown in the idle position, and it will be noted that the lower ends of right-hand vertical members 11, 12 and 13 are above the horizontal plane of the corresponding top ends of the right-hand vertical arms of plate 119, and that any subsequent operation of plate 119 to the right would cause the right-hand vertical arms of plate 119 to pass underneath the lower ends of right-hand vertical members 11, 12 and 13. The depicting of lower ends of right-hand vertical members 11, 12 and 13 above the top ends of the corresponding vertical arms of plate 119 is a simple diagrammatic means for indicating that the right-hand vertical members 11, 12 and 13 are not in a condition for being pressed into contact with conductors 4, 5 and 6 of trunk 10 and are, therefore, unaffected by any subsequent operation of plate 119. The lower ends of right-hand vertical members 21, 22 and 23 are shown above the horizontal plane of the corresponding top ends of the right-hand vertical arms of plate 147 to similarly indicate that right-hand vertical members 21, 22 and 23 are also not in a condition for being pressed into contact with conductors 4, 5, and 6 of trunk 10. It is, therefore, apparent that neither line A or line Z can be connected to trunk 10 while trunk 10 remains in the idle position.

In order that any one of the sets of vertical depending members associated with a trunk which is in the idle position may be connected to the conductors of that trunk, the sets of vertical members associated therewith are so conditioned that an operation of either horizontal plate 119 or horizontal plate 147 to the right will be effective to press one of the sets of vertical members into contact with the conductors of the trunk. The manner in which the conditioning of the sets of vertical members associated with a trunk in the idle position is accomplished is described in the following three paragraphs.

Associated with each trunk is a vertically disposed bar, such as bar 34 with trunk 1 and bar 44 with trunk 10. These bars are for the purpose of causing the conditioning of the vertical members associated with the conductors of the related trunks in order that lines subsequently initiating outgoing calls may be connected to the trunks. The operation of conditioning the vertical members associated with the conductors of a trunk is known as pre-assigning the particular trunk (which was in the idle position just prior to the conditioning operation) for subsequent use on an outgoing call initiated by one of the lines having access to the trunk. The arrangement of the bars with respect to the trunks, and the relationship of the bars with each other, are such that only one bar at a time can pre-assign a trunk. As soon as a pre-assigned trunk is taken into use, common control equipment immediately causes another trunk in the idle position to be pre-assigned, and successive pre-assignments of trunks in the idle positions will occur as additional outgoing calls are initiated on the lines.

The vertically disposed bars, such as 34 and 44, have upwardly and downwardly movements controlled by cam-operated levers upon which the lower ends of the bars rest. Bar 44 associated with trunk 10 is shown in the upward, or normal, position and while in this position cannot cause the conditioning of right-hand vertical members 11, 12 and 13 and right-hand vertical members 21, 22 and 23. The right-hand vertical members 11, 12 and 13 are, therefore, unaffected by any subsequent operation of plate 119, and right-hand vertical members 21, 22 and 23 correspondingly unaffected by any subsequent operation of plate 147. Trunk 10, consequently, remains in the idle position for the time being. The dotted line 47 projecting from bar 44 across right-hand vertical members 11, 12 and 13, and the dotted line 48 projecting from bar 44 across right-hand vertical members 21, 22 and 23 indicate that bar 44 controls the conditioning of these particular vertical members.

Bar 34 associated with trunk 1 is shown in the lower, or operated, position, and in this position has pre-assigned trunk 1. Before bar 34 was dropped to the lower position by the operation of lever 32, trunk 1 was in the idle position, and the purpose of dropping bar 34 to the lower position is to cause bar 34 to pre-assign trunk 1 for use on a subsequent outgoing call from either line A or line Z by having bar 34 cause the conditioning of left-hand vertical members 11, 12 and 13 and left-hand vertical members 21, 22 and 23. The dropping of bar 34 accomplishes the conditioning of left-hand vertical members 11, 12 and 13 and left-hand vertical members 21, 22 and 23 by permitting these vertical members to drop by gravity to corresponding lower positions whereby the lower ends of these vertical members are below the horizontal planes of the top ends of the left-hand vertical arms of plate 119 or plate 147. It is, therefore, apparent that any subsequent movement of plate 119 to the right will cause its left-hand vertical arms to press left-hand vertical members 11, 12 and 13 into electrical contact with conductors 1, 2 and 3 of trunk 1, and that any subsequent movement of plate 147 to the right will cause its left-hand vertical arms to press left-hand vertical members 21, 22 and 23 into electrical contact with conductors 1, 2 and 3 of trunk 1. The depicting of the lower ends of left-hand vertical members 11, 12 and 13 and the lower ends of left-hand vertical members 21, 22 and 23 below the horizontal planes of the top ends of the respective left-hand vertical arms of plates 119 and 147 is a simple diagrammatic means for indicating that left-hand vertical members 11, 12, 13, 21, 22 and 23 have been conditioned for being pressed into contact with conductors 1, 2 and 3 of trunk 1. The dotted line 37 projecting from bar 34 across left-hand vertical members 11, 12, 13, and the dotted line 38 projecting from bar 34 across left-hand vertical members 21, 22 and 23 indicate that bar 34 controls the conditioning of these particular vertical members. For detail information concerning the precise arrangement of the mechanical parts involved in the conditioning of vertical members 11, 12, 13, 21, 22 and 23 and the exact operation of such mechanical parts, reference should be had to the previously mentioned application.

Considering now that an outgoing call is initiated on line A and that trunk 1 has been pre-assigned as shown in Figure 1, the circuit of line relay 110 is completed from ground, upper winding of relay 110, armature 121, conductor 101, direct-current loop (not shown) of line A, conductor 102, armature 122, lower winding of relay 110, armatures 114, 136, 115, conductor 105, armature 106, resistor 107 to battery, causing relay 110 to first operate its X contact associated with armature 113. The operation of this X contact switches the lower winding of relay 110 directly to conductor 105 independent of the resting contacts of armatures 114, 136 and 115. Relay 110 then operates completely. At armature 115, relay 110 opens the chain circuit to resistor 107 thereby to prevent the completion of the circuit through the lower winding of the line relay associated with line Z should an outgoing call be initiated on line Z. At armature 116, relay 110 completes a circuit to common relay 135 by way of armature 131 and resting contact, causing relay 135 to operate and open a further point in the previously mentioned chain circuit to the lower winding of the line relay of line Z at armature 136. By means of armature 117, relay 110 inserts trigger device 118 between the lower arm of cut-off relay armature 126 and the left-hand end of horizontal plate 119. At armature 111 and working contact, relay 110 extends ground to the C connector terminal of line A by way of conductors 103, 13 and 17 to guard line A against intrusion.

At armature 137, common relay 135 connects ground potential to conductor 1 of pre-assigned trunk 1 by way of armature 8 and working contact, thereby seizing trunk 1 and the associated connector 10. It should be understood at this time that relay 7 of trunk 1 was operated over the circuit completed at contact 35 at the time trunk 1 was pre-assigned and is held operated during the period that trunk 1 remains in the pre-assigned position. The seizing of trunk 1 by the application of ground to trunk conductor 1 causes relay 50 in connector 10 to operate through its upper winding and completes an obvious circuit to relay 55 which in turn connects ground potential to conductor 3 of trunk 1. This ground potential over conductor 3 completes the circuit to cut-off relay 120 of line A by way of armature 9 and working contact, armatures 19, 132, 112, conductor 123, winding of cut-off relay 120 to battery, causing cut-off relay 120 to operate. At armature 124, cut-off relay 120 connects its winding to ground by way of armature 111; and, at armature 125, completes the circuit to lockout relay 130 by way of armature 111, causing lockout relay 130 to operate. The operation of cut-off relay 120 also causes armature 126 to move horizontal plate 119 to the right because the presence of trigger device 118 between the lower arm of armature 126 and the left-hand end of plate 119 provides the addition necessary to the lower arm of armature 126 to cause the movement of plate 119 to the right. Without the aid of trigger device 118, the lower arm of armature 126 in its operated position would just reach the left-hand end of plate 119 but could not cause the moving of plate 119 to the right. The right-wise movement of plate 119 causes its left-hand vertical arms to press left-hand vertical members 11, 12 and 13 into contact with conductors 1, 2 and 3 of trunk 1. The right-hand vertical arms of plate 119 pass underneath the lower ends of right-hand vertical members 11, 12 and 13 and, therefore, no connection can be extended from line A to trunk 10 at this time. The vertical arms of plate 119 are shown as heavy filled-in lines to indicate that plate 119 is electrically insulated from vertical members 11, 12 and 13.

The pressing of left-hand vertical members 11 and 12 into contact with conductors 1 and 2 of trunk 1 extends line A to the operating circuits of connector 10 thereby transferring the control of relay 50 to the direct-current loop of line A. As a result of this transference of control, ground potential will remain on trunk conductor 3 as long as line A retains control of connector 10. When lockout relay 130 was operated by the action of cut-off relay 120, it opened the circuit to common relay 135 at armature 131, and the restoration of common relay 135 opened one circuit to the upper winding of relay 50 at armature 137. The slow release action of relay 55, however, retains ground potential on trunk conductor 3 until relay 50 is operated over the loop of line A.

The pressing of left-hand vertical member 13 into contact with conductor 3 of trunk 1 extends the ground potential on conductor 3 to the winding of cut-off relay 120 by way of armature 124 thereby locking cut-off relay 120 in the operated position independent of the ground from armature 111 of line relay 110. The operation and locking of cut-off relay 120 disconnects the windings of line relay 110 from conductors 101 and 102 and from line A, thereby clearing line A of attachments. The restoration of common relay 135 also completes a circuit in multiple to relay 20 and electromagnet 30 by way of ground on conductor 3, armature 9 and armature 138 for the purpose of causing the pre-assignment of another idle trunk in the manner to be described later in this section.

The disconnection of the windings of line relay 110 from line A by the operation of armatures 121 and 122 causes line relay 110 to restore to normal position. Since the ground on conductor 3 of trunk 1 is extended to the winding of cut-off relay 120 immediately the left-hand vertical member 13 is pressed into contact with conductor 3 by the operation of cut-off relay 120, it is unnecessary for line relay 110 to be of the slow-to-release type for the purpose of retaining ground on the winding of cut-off relay 120 for a short period after cut-off relay 120 has disconnected line relay 110 from conductors 101 and 102 and, therefore, line relay 110 is shown as a fast releasing relay. At armature 115, relay 110 completes the chain circuit for the lower winding of the line relay associated with line Z in order that this line relay may operate should line Z now initiate an outgoing call. At armature 114, line relay 110 completes the chain circuit to its own lower winding. The restoration of line relay 110 does not remove trigger device 118 from its position between the lower arm of armature 126 and the left-hand end of plate 119, as armature 126 firmly holds trigger device 118 against the left-hand end of plate 119, thereby causing plate 119 to retain left-hand vertical members 11, 12 and 13 in contact with conductors 1, 2 and 3 of trunk 1.

Digressing for the moment from the description of the call from line A, an explanation will now be given of the method of automatically pre-assigning trunks to successive calls initiated at the local stations such as A and Z. In the foregoing description it was stated that cam-operated levers controlled the upwardly and downwardly movements of the vertically disposed bars, such as bars 34 and 44, associated with the trunks. Lever 32 is controlled by cam 31, and lever 42 by cam 41. Cams 31 and 41 are mounted on a common shaft 29 which is operative by electromagnet 30 through the medium of armature pawl 39. Lever 32 is pivoted at 33 and, consequently, when the left-hand end of lever 32 permitted bar 34 to drop by gravity to its lower position, the right-hand end of lever 32 caused contact 35 to complete an obvious circuit to relay 7 of trunk 1. The dropping of bar 34 caused the pre-assignment of trunk 1, and the initiation of the call on line A caused line A to be extended over trunk 1 to connector 10 in the manner previously explained.

As previously stated, the restoration of common relay 135 completes a circuit in multiple to relay 20 and electromagnet 30 and, as a consequence, both relay 20 and electromagnet 30 operate. At armature 19, relay 20 opens the circuit to conductor 106 of the line equipment of line Z thereby to prevent the operation of the cut-off relay of line Z line equipment so that line Z cannot be extended to trunk 1 should line Z initiate a call at this time. The operation of electromagnet 30 causes armature pawl 39 to advance shaft 29 one trunk step in a clockwise direction. Cam 31, therefore, leaves the right-hand end of lever 32, and the tensioned springs associated with contact 35 cause lever 32 to raise bar 34 to the upper position. Contact 35 is also opened by this movement of lever 32, causing relay 7 associated with trunk 1 to restore and open the multiple circuit to relay 20 and electromagnet 30 at armature 9. Electromagnet 30 restores immediately but relay 20 is of the slow-to-release type. Pawl 49 retains shaft 29 in the advanced position. The raising of bar 34 has no effect on the established connection of line A with connector 10, as cut-off relay 120 continues to hold plate 119 to the right thereby maintaining left-hand vertical members 11, 12 and 13 in firm contact with conductors 1, 2 and 3 of trunk 1. The raising of bar 34, however, causes left-hand vertical members 21, 22 and 23 to be returned to their original, or normal, positions in which positions the lower ends of these vertical members are above the horizontal plane of the top ends of the left-hand vertical arms of plate 147 and, therefore, no subsequent movement of plate 147 to the right can cause the extension of line Z to conductors 1, 2 and 3 of occupied trunk 1.

As the operation of armature pawl 39 stepped cam 31 away from lever 32, it also caused cam 41 to approach and operate the right-hand end of lever 42 associated with trunk 10, thereby causing contact 45 to complete an obvious circuit to relay 18 of trunk 10. Assuming now that trunk 10 is in the idle position, then the left-hand end of lever 42 causes bar 44 to drop by gravity to its lower position, thereby pre-assigning trunk 10 in a manner similar to that previously described in connection with the pre-assignment of trunk 1. If, however, trunk 10 is occupied at the time relay 18 operates, the multiple circuit to relay 20 and electromagnet 30 will be completed from ground on conductor 6 of trunk 10, armature 28 and armature 138, causing electromagnet 30 to operate and retaining relay 20 in the operated position. Relay 20 is slow to release and, therefore, did not restore when its circuit was opened at armature 9 before its circuit is completed at armature 28. The function of relay 20 is to maintain the multiple operating circuit to the cut-off relays of the lines open while an idle trunk is being found and pre-assigned, in order that no calling line will be extended to an occupied trunk.

The re-operation of electromagnet 30 due to trunk 10 being found in the busy condition causes armature pawl 39 to advance shaft 29 another trunk step which in the normal event would select trunk 9 (not shown). Occupied trunk 10 is thus by-passed, and relay 18 restored to normal. If trunk 9 is in the idle position, then there will be no ground potential returned to armature 138 from trunk 9, and trunk 9 is then pre-assigned in readiness for the next outgoing call on a line circuit. In the manner just described, occupied trunks are by-passed and trunks in the idle position are pre-assigned.

Returning now to the connection of line A with connector 10 by way of trunk 1, as previously stated the ground on trunk conductor 3 from relay 55 of connector 10 is extended through left-hand vertical member 13 to the winding of cut-off relay 120 and to conductor 17 leading to the C terminal of the connector bank terminals of line A. The ground on the winding of cut-off relay 120 causes cut-off relay 120 to maintain the connection of line A with connector 10 as long as the direct-current loop of line A remains intact. The ground to the C terminal of the connector terminals of line A guards line A from intrusion by other calls as is conventional in telephone systems of this character.

Assuming further that line A desires a connection with line Z, then line A controls connector 10 in a well-known manner to cause wipers 51, 52 and 53 of connector 10 to connect with the bank terminals of line Z. Connector 10 tests the C bank terminal of line Z for a possible busy condition and finding line Z in the idle position then connects ground potential to the winding of cut-off relay 140 by way of conductors 27, 23, 109, armature 139 and resting contact, conductor 143, winding of cut-off relay 140 to battery. Cut-off relay 140 operates over the circuit just traced and locks to the ground from wiper 53 by way of armature 144. The ground on wiper 53 also guards line Z from intrusion by other calls. At armatures 141 and 142, cut-off relay 140 clears line Z of attachments; and, at armature 145, completes the circuit to the associated lockout relay. The operation of cut-off relay 140 also causes armature 146 to operate but armature 146 cannot cause a movement of plate 147 to the right because the lower arm of armature 146 in the operated position just reaches the left-hand end of plate 147. Connector 10 now automatically signals line Z in a well-known manner, and when line Z answers the call the signalling circuit is disconnected and a transmission circuit is established between lines A and Z. Transmission battery is supplied to line A from the windings of relay 50 of connector 10, and to line Z from the windings of relay 60.

Upon the termination of the conversation and the opening of the direct-current loop of line A, connector 10 is restored to normal in a well-known manner. The consequent removal of ground potential from conductor 3 of trunk 1 opens the locking circuit of cut-off relay 120, and cut-off relay 120 restores. At armatures 121 and 122, cut-off relay 120 reconnects the windings of line relay 110 across the conductors of line A: at armature 125, opens the circuit to lockout relay 130, causing lockout relay 130 to restore; and the release of armature 126 permits trigger device 118 to drop to its normal lower position and also permits plate 119 to move to the left under the power of tensioned spring 127. The restoring of plates 119 causes the disconnection of left-hand vertical members 11, 12 and 13 from trunk conductors 1, 2 and 3, and the disconnected left-hand vertical members 11, 12 and 13 are then restored to their original, or normal, positions in the manner described in the previously mentioned application, in order that their lower ends may be raised above the horizontal plane of the top ends of the left-hand vertical arms of plate 119. The disconnection of wiper 53 of connector 10 opens the locking circuit of cut-off relay 140 thereby permitting cut-off relay 140 to restore to normal. At armatures 141 and 142, cut-off relay 140 reconnects the windings of the associated line relay across the conductors of line Z; and, at armature 145, opens the circuit to the associated lockout relay. Trunk 1 is now in the idle position.

It will now be assumed that lines A and Z are in their normal idle positions, that trunk 1 has been pre-assigned as indicated in Figure 1, that connector 10 has been fitted with the time limit control facilities shown in Figure 5 for automatically removing the ground potential from trunk conductor 3 should a calling line fail to dial within a definite time interval after having seized connector 10, and that line A has initiated an outgoing call. Under these assumed conditions line relay 110 operates and causes cut-off relay 120 to extend line A to connector 10 by way of trunk 1 in the manner previously described. It is further assumed that line A after having initiated the outgoing call fails to dial the wanted number before the expiration of the definite time interval and, as a consequence of this failure to dial within the definite time interval, the ground potential on trunk conductor 3 is removed. Cut-off relay 120, therefore, restores and opens the circuit to lockout relay 130 at armature 125 but lockout relay 130 is of the slow-to-release type and remains operated for a short interval. In the meantime the windings of line relay 110 are reconnected across the conductors of line A at armatures 121 and 122, and since the direct-current loop of line A remains closed, line relay 110 immediately re-operates and completes a locking circuit to lockout relay 130 by way of armature 116 and armature 131 and working contact before lockout relay 130 has had time to restore. When cut-off relay 120 reconnected the windings of line relay 110 to line A, line relay 110 was able to operate immediately, regardless of whether another line relay had previously operated on an outgoing call and was holding the chain circuit to line relay 110 open, because the battery end of the lower winding of line relay 110 was connected direct to battery through resistor 107 at armature 133 independent of the chain circuit through armatures 114, 136, 115 and 106. The restoration of cut-off relay 120 also releases trunk 1 and connector 10 in the manner previously explained, thereby restoring trunk 1 to the normal idle position. Line A is now in the locked out position with line relay 110 and lockout relay 130 both operated. At armature 132, lockout relay 130 maintains the operating circuit to the winding of cut-off relay 120 open so that cut-off relay 120 cannot re-operate as long as the closed-loop condition on line A continues to exist. When line A disconnects, line relay 110 restores and opens the locking circuit to lockout relay 130 at armature 116, thus permitting lockout relay 130 to restore and re-establish the cut-off relay operating circuit at armature 132 and resting contact.

The time limit control facilities shown in Figure 5 and associated with connector 10 consists of relays 70 and 85, time limit control switch 59 and associated stepping magnet 90 and release magnet 95, and additional contacts to relays 50 and 55 of connector 10. The first six bank contacts of time limit control switch 59 are shown multipled together, the seventh bank contact thereby forming a definite predetermined off-normal position. It should be understood, however, that the arrangement of the time limit control switch need not be exactly as shown, as any well-known timing device method may be employed. The operation of the time limit control equipment is as follows:

When connector 10 is seized in the manner previously described, relay 50 completes an obvious circuit to relay 55 which in turn connects ground potential to trunk conductor 3 by way of conductor 58 (Figure 5), wiper of time limit control switch 59, bank contact 1, contact multiple and conductor 68. This ground potential over trunk conductor 3 causes cut-off relay 120 to operate in the manner also previously described. The operation of relay 55 also causes relay 70 to operate over the circuit by way of conductor 67. At armature 82, relay 70 connects ground potential to the winding of stepping magnet 90 by way of armature 87 and resting contact. The other end of the winding of stepping magnet 90 is connected to common contact 91 which is operated at certain intervals by means of the common timer cam 99 and, therefore, stepping magnet 90 is energized and advances the wiper of time limit control switch 59 one bank contact step for each revolution of timer cam 99. The timer cam 99 may, for example, be arranged to make one revolution every five seconds, with the result that the wiper will be brought into engagement with bank contact 7 after a period of 30 seconds, or one-half minute, has lapsed. The timed interval need not be limited to one-half minute as the timer cam 99 can be operated at any desired speed, and any number of bank contacts can be multipled together to obtain the desired overall timed interval.

Should line A fail to start dialing before the predetermined time interval has lapsed, the wiper of time limit control switch 59 will pass from bank contact 6 to bank contact 7. Ground potential is, therefore, removed from conductor 68, and cut-off relay 120 restores as previously explained.

Should line A, however, commence dialing before the predetermined time interval has lapsed, i. e., before the wiper of time limit control switch 59 leaves bank contact 6, relay 85 is operated from ground by way of conductor 69 and armature 81. Relay 85 locks to ground on conductor 58 by way of armature 86. At armature 87, relay 85 removes ground from the winding of stepping magnet 90 to prevent further rotation of the wiper of time limit control switch 59 and, at armature 88, completes the circuit to release magnet 95. Release magnet 95 causes the wiper to be returned to the normal position (bank contact 1) in a well-known manner, and the opening of off-normal spring set 94 as the wiper reaches the position of bank contact 1 disables the operating circuit of release magnet 95. Line A, therefore, remains connected to trunk 1 and connector 10.

*Outgoing trunking operation with "graded" trunks*

In Figure 1 are shown a number of lines having access to a number of outgoing trunks. Theoretically, as indicated in the preceding section of this specification, the maximum number of line equipments which may be mounted on a single framework or rack may be any number according to particular requirements or preference, as may also be the maximum number of trunk outlets. There are, however, usually limitation of a mechanical nature, such as overall space dimensional restrictions, shipping conditions and the like, which make it undesirable or uneconomical to provide for more than a certain maximum number of line equipments and trunk outlets on a single framework. For example, conditions may make it necessary to limit the number of line equipments to 100, and the trunk outlets accessible to the 100 line equipments to 10. The outgoing trunks terminating the trunk outlets in such an instance would, therefore, provide for a maximum of 10 percent trunking. Should it be desirable or necessary to provide for a greater percent of outgoing trunking for the 100 line equipments than 10, and it is unfeasible to increase the one group of trunk outlets beyond 10, then the 100 line equipments may be divided into two subgroups of 50 line equipments each, with each subgroup of 50 line equipments having access to 10 trunk outlets. If each group of 10 trunk outlets is then connected to 10 outgoing trunks, the percent of outgoing trunking thus provided is increased to 20 percent. A lesser number of outgoing trunks connected to each group of 10 trunk outlets would correspondingly reduce the outgoing trunking below 20 percent.

Figure 2:
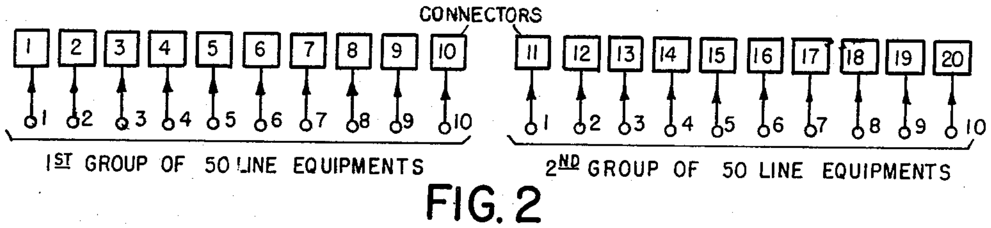
Figure 2 shows an arrangement whereby 100 line equipments divided into two subgroups of 50 line equipments each and each subgroup having access to 10 outgoing trunks, are provided with 20 percent trunking facilities.

Figure 2 shows in simple diagrammatic form two subgroups of 50 line equipments, each subgroup having 10 trunk outlets represented by the small circles designated 1 to 10 inclusive. Connected to the 10 trunk outlets of the left-hand subgroup are 10 connectors (outgoing trunks) represented by the squares designated 1 to 10 inclusive, and correspondingly the 10 trunk outlets of the right-hand sub group are connected to connectors 11 to 20 inclusive. It is obvious that each subgroup of 50 line equipments is provided with 20 percent outgoing trunking facilities, and that each subgroup is independent of the other subgroup.

Figure 3:
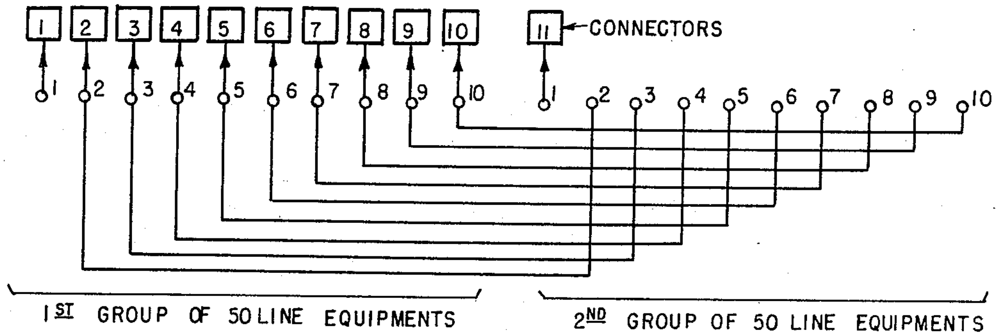
Figure 3 shows an arrangement whereby 100 line equipments are provided with eleven percent trunking facilities by means of "graded" trunks.
Figure 4:
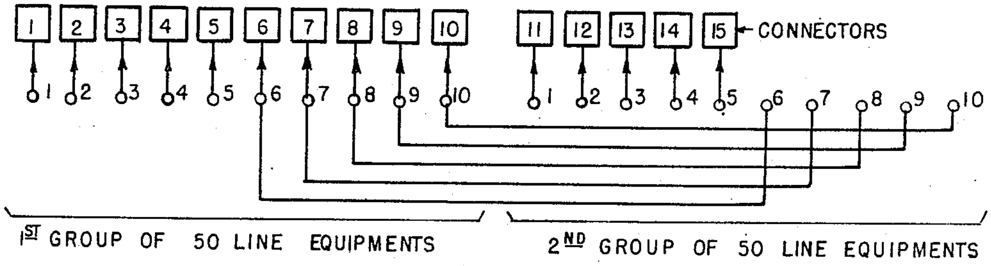
Figure 4 shows an arrangement whereby 100 line equipments are provided with 15 percent trunking facilities by means of "graded" trunks.

Figure 3 shows an arrangement of two subgroups of 50 line equipments served by 11 outgoing trunks, thereby providing 11 percent trunking for the 100 line equipments. The 11 percent of trunking is accomplished by applying the well-known principles of "trunk grading" whereby trunk 1 is a first-choice trunk individual to the left-hand subgroup, trunk 11 a first-choice trunk individual to the righthand subgroup, and trunks 2 to 10 inclusive second-choice trunks common to both subgroups. In a similar manner Figure 4 shows an arrangement whereby the two subgroups are served by 15 outgoing trunks, thereby providing 15 percent trunking for the 100 line equipments. In this arrangement, trunks 1 to 5 inclusive are first-choice trunks individual to the left-hand subgroup, trunks 11 to 15 inclusive first-choice trunks individual to the right-hand subgroup, and trunks 6 to 10 inclusive second-choice trunks common to both subgroups.

It should be understood that in the short description of outgoing trunking in the preceding three paragraphs the number of line equipments, trunk outlets, and trunks specified are for explanatory purposes only and should not be construed as being binding or restrictive in any manner.

The following explanation of the circuit diagrams of Figures 6 and 7 covers outgoing trunking operation when the trunks are graded in accordance with the arrangement shown in Figure 3.

In the circuit diagram of Figure 6 are shown two lines and ten trunks designated line 1, line 50, trunk 1, trunks 2 to 9 inclusive, and trunk 10. The vertical conductors between lines 1 and 50 are broken to indicate that in reality lines 2 to 49 inclusive are interposed between lines 1 and 50 although not shown. It should be understood, however, that the number of lines need not be exactly 50 but may be more or less according to desire or the grade of service to be rendered. As in the case of Figure 1, the lines may be equipped with telephone instruments of any well-known manual or automatic type, according to the kind of subscriber service it is intended to provide, or the lines may be connected to suitable equipment on an operator controlled switchboard to care for service from and to such a manual switchboard. The horizontal conductors broken between trunks 1 and 10 are broken to indicate that trunks 2 to 9 inclusive are interposed between trunks 1 and 10. Trunks 2 to 9 inclusive, however, are not shown in detail. It should also be understood at this time that the number of trunks need not be exactly 10 but may be more or less according to desire or the amount of traffic offered by the total number of lines. As in the case of Figure 1, the trunks may terminate in automatic switches of any well-known type for providing outgoing service from the lines, or the trunks may terminate on an operator-controlled switchboard in order that outgoing calls initiated on the lines may be completed by operators. For the purpose of this explanation it is assumed that the lines of Figure 6 are equipped with telephone instruments of the automatic dial type, and that the trunks terminate in connector switches of the well-known Strowger type although the connectors are not shown.

Figure 7 circuit diagram is similar to the circuit diagram of Figure 6 and includes two lines designated line 51 and 100 respectively, a trunk designated trunk 11, and multiple appearances of trunk 2 to 10 inclusive from Figure 6. The vertical conductors between lines 51 and 100 are broken to indicate that lines 52 to 99 inclusive are interposed between lines 51 and 100 although not shown. The horizontal conductors between trunk 11 and the multiple appearance of trunk 10 are broken to indicate that multiple appearances of trunks 2 to 9 inclusive are interposed between trunk 11 and the multiple appearance of trunk 10. The multiple appearance of trunks 2 to 9 inclusive, however, are not shown in detail. As in the case of Figure 6, it is assumed that the lines are equipped with telephone instruments of the automatic dial type, and that trunk 11 terminates in a connector switch of the well-known Strowger type.

In addition to the lines and trunks shown in Figures 6 and 7, a sufficient amount of mechanical parts of the invention covered by Patent No. 2,541,354 are included in these two diagrams to make the explanation more readily understandable, but these mechanical parts are shown in diagrammatic form rather than in elevation in order to reduce Figures 6 and 7 to their simplest forma. Only a general explanation of these mechanical parts and their operations will be given in the specification as reference may be had to the aforementioned Patent No. 2,541,354 for a complete understanding of the inter-relationship of these mechanical parts and their operations.

Referring particularly to Figure 6, bare wire conductors 61, 62 and 63 of trunk 1 are supported in a vertical plane and are connected to a connector switch (connector switch not shown but would be similar to connector switch 10 in Figure 1). Similarly, bare wire conductors 64, 65 and 66 of trunk 10 are connected to a connector switch as are also the bare wire conductors of trunks 2 to 9 inclusive. As in the case of the exact number of trunks, the number of vertical bare wire conductors of each trunk need not be exactly three but may be more or less according to circumstance.

Line 1 is connected to conductors 601 and 602 leading to the resting contacts of armatures 621 and 622 respectively of a line circuit and also to the horizontally disposed line equipment conductors 661 and 662. In a similar manner, line 50 is connected to another line circuit and to the horizontally disposed line equipment conductors 671 and 672. The connector terminals of line 1 are connected to conductors 665, 666 and 667 leading to line equipment conductors 661, 662 and 663 respectively, and in a similar manner the connector terminals of line 50 are connected to conductors 675, 676 and 677 leading to line equipment conductors 671, 672 and 673 respectively.

The horizontally disposed line equipment conductors 661, 662, 663, 671, 672 and 673 each have a vertically disposed member depending therefrom for each of the trunks. These vertically disposed vertical members are associated with the conductors of the trunks in order that lines 1 and 50 may be connected with the trunks in a manner similar to that previously described in this specification for the horizontally disposed line equipment conductors 11, 12, 13, 21, 22 and 23 shown in Figure 1. In Figure 6, the means for connecting vertical members 661, 662 and 663 to the conductors of the trunks is represented by the horizontal plate 619 and its vertical arms, and similarly the means for connecting vertical members 671, 672 and 673 to the conductors of the trunks is represented by the horizontal plate 657 and the associated vertical arms.

Trunk 10 (Figure 6) if shown in the idle position, and it will be noted that the lower ends of right-hand vertical members 661, 662 and 663 are shown above the horizontal plane of the corresponding top ends of the right-hand vertical arms of plate 619, and that any subsequent operation of plate 619 to the right would cause the right-hand vertical arms of plate 119 to pass underneath the lower ends of right-hand vertical members 661, 662 and 663. The lower ends of right-hand vertical members 671, 672 and 673 are shown above the horizontal plane of the corresponding top ends of the right-hand vertical arms of plate 657 to similarly indicate that right-hand vertical members 671, 672 and 673 are also not in a condition for being pressed into contact with conductors 64, 65 and 66 of trunk 10. It is, therefore, apparent that neither line 1 nor line 50 can be connected to trunk 10 while trunk 10 remains in the idle position.

In order that any one of the sets of vertical depending members associated with a trunk which is in the idle position may be connected to the conductors of that trunk, the sets of vertical members associated therewith are conditioned in a manner similar to that described in the preceding section so that an operation of either horizontal plate 619 or horizontal plate 657 to the right will be effective to press one of the sets of vertical members into contact with the conductors of the trunk. Vertically disposed bar 634 is associated with trunk 1, and bar 644 with trunk 10 for the purpose of causing the conditioning of the vertical members associated with the conductors of the related trunks in order that lines subsequently initiating outgoing calls may be connected to the trunks. The operation of conditioning the vertical members associated with the conductors of a trunk is known as pre-assigning the particular trunk (which was in the idle position just prior to the conditioning operation) for subsequent use on an outgoing call initiated by one of the lines having access to the trunk. The arrangement of the bars with respect to the trunks, and the relationship of the bars with each other, are such that only one bar at a time can pre-assign a trunk. As soon as a pre-assigned trunk is taken into use, common control equipment immediately causes another trunk in the idle position to be pre-assigned, and successive pre-assignments of trunks in the idle positions will occur as additional outgoing calls are initiated on the lines.

Bar 644 associated with trunk 10 is shown in the normal, or upward, position, and while in this position cannot cause the conditioning of right-hand vertical members 661, 662 and 663 and right-hand vertical members 671, 672 and 673. The right-hand vertical members 661, 662 and 663 are, therefore, unaffected by any subsequent operation of plate 619, and right-hand vertical members 671, 672 and 673 are correspondingly unaffected by any subsequent operation of plate 657. Trunk 10, consequently, remains in the idle position for the time being. The dotted line 647 projecting from bar 644 across right-hand vertical members 661, 662 and 663, and the dotted line 648 projecting from bar 644 across right-hand vertical members 671, 672 and 673 indicate that bar 644 controls the conditioning of these particular vertical members.

Bar 634 associated with trunk 1 is shown in the operated, or lower, position, and in this position has pre-assigned trunk 1. When bar 634 was dropped to the lower position, it accomplished the conditioning of left-hand vertical members 661, 662 and 663 and left-hand vertical members 671, 672 and 673 by permitting these vertical members to drop by gravity to corresponding lower positions whereby the lower ends of these vertical members are below the horizontal planes of the top ends of the left-hand vertical arms of plate 619 or plate 657. It is, therefore, apparent that any subsequent movement of plate 619 to the right will cause its left-hand vertical arms to press left-hand vertical members 661, 662 and 663 into electrical contact with conductors 61, 62 and 63 of trunk 1, and that any subsequent movement of plate 657 to the right will cause its left-hand vertical arms to press left-hand vertical members 671, 672 and 673 into electrical contact with conductors 61, 62 and 63 of trunk 1. The dotted line 649 projecting from bar 634 across left-hand vertical members 661, 662 and 663, and the dotted line 670 projecting from bar 634 across left-hand vertical members 671, 672 and 673 indicate that bar 634 controls the conditioning of these particular vertical members.

Referring now to Figure 7, bare wire conductors 71, 72 and 73 of trunk 11 are supported in a vertical plane and are connected to a connector switch (not shown). Bare wire conductors 74, 75 and 76 of trunk 10 are supported in a vertical plane but are not directly connected to a connector switch as in the case of conductors 71, 72 and 73 but are connected by means of conductors 77, 78 and 79 in cable 80 to conductors 64, 65 and 66 of trunk 10 in Figure 6 thereby multiplying trunk 10 of Figure 7 to trunk 10 of Figure 6. In similar manner, the bare wire vertical conductors of trunks 2 to 9 inclusive of Figure 7 are multiplied to the vertical conductors of trunks 2 to 9 inclusive of Figure 6. Lines 51 and 100 (Figures 7) are each connected to a line circuit and to the horizontally disposed line equipment conductors 761, 762, 771 and 772 respectively in a similar manner to line 1 of Figure 6. The connector terminals of line 51 are connected to conductors 765, 766 and 767 leading to line equipment conductors 761, 762 and 763 respectively, and the connector terminals of line 100 to conductors 775, 776 and 777 leading to line equipment conductors 771, 772 and 773 respectively. In addition, conductors 604, 605 and 606 are required between the line circuits of Figures 6 and 7 in order that the chain circuit to resistor 609 may be carried through all of the line circuits of Figures 6 and 7 in series for the purpose of preventing more than one outgoing call being extended to a trunk at one time.

The general arrangement of the horizontally disposed line equipment conductors 761, 762, 763, 771, 772 and 773 and the vertically disposed bars 734 and 744 is similar to that previously described for conductors 661, 662, 663, 671, 672 and 673 and bars 634 and 644. It is, therefore, considered unnecessary to include such details here. Bar 744 is associated with trunk 10 and is shown in the normal position. Trunk 10 (Figure 7), consequently, is in the idle position. Bar 734 is associated with trunk 11 and is shown in the operated position. Trunk 11, consequently, is in the pre-assigned position.

Considering now that an outgoing call is initiated on line 1 and that trunk 1 has been preassigned as shown in Figure 6, the circuit of line relay 610 is completed from ground, armature 621, conductor 601, direct-current loop (not shown) of line 1, conductor 602, armature 622, winding of line relay 610 to battery, causing relay 610 to operate. At armature 612, relay 610 removes the shunt across armature 623 and associated resting contact, thereby permitting the control of the chain circuit through all of the line circuits of Figure 6 and Figure 7 to be taken over by armature 623 of the associated cut-off relay. By means of armature 617, relay 610 inserts trigger device 618 between the lower arm of cut-off relay armature 626 and the left-hand end of horizontal plate 619. An armature 613, relay 610 extends ground to the C connector terminal of line 1 by way of conductors 603, 663, and 667 to guard line 1 against intrusion. At armature 613, relay 610 also completes a circuit to cut-off relay 620 from ground, armatures 616, 613, conductor 603, winding of cut-off relay 620, armature 611 and working contact, armature 624 and resting contact, conductor 604 to Figure 7, armature 705 (shunted by armature 706), conductor 707, armature 708 (shunted by armature 709), conductor 606 to Figure 6, armature 653 (shunted by armature 607), conductor 608, armature 623, resistor 609 to battery, causing cut-off relay 620 to operate.

At armatures 621 and 622, cut-off relay 620 disconnects line relay 610 from the direct-current loop of line 1 but line relay 610 is of the slow-to-release type and, therefore, remains operated for a short period of time. At armature 624 and working contact, cut-off relay 620 switches its winding to resistor 609 independent of the chain circuit through the other line circuits. The operation of cut-off relay 620 also causes armature 626 to move horizontal plate 619 to the right because the presence of trigger device 618 between the lower arm of armature 626 and the left-hand end of plate 619 provides the addition necessary to the lower arm of armature 626 to cause the movement of plate 619 to the right. The right-wise movement of plate 619 causes its left-hand vertical arms to press left-hand vertical members 661, 662 and 663 into contact with conductors 61, 62 and 63 of trunk 1. The right-hand vertical arms of plate 619 pass underneath the lower ends of right-hand vertical members 661, 662 and 663 and, therefore, no connection can be extended from line 1 to trunk 10 at this time. The lower ends of the vertical members (not shown) which are associated with trunks 2 to 9 inclusive (partly shown) would also be above the horizontal plane of the related vertical arms (not shown) of plate 619 and, therefore, no connection can be extended from line 1 to trunks 2, 3, 4, 5, 6, 7, 8 or 9 at this time.

The pressing of left-hand vertical members 661 and 662 into contact with conductors 61 and 62 of trunk 1 extends line 1 to the operating circuit of the connector (not shown) associated with trunk 1. The direct-current loop of line 1 bridged across the "—" and "+" conductors of the connector (not shown) causes a relay (not shown) in the connector to operate in a well-known manner and cause ground potential to be connected to conductor 63 of trunk 1. The pressing of left-hand vertical member 663 into contact with conductor 63 of trunk 1 extends the ground potential on conductor 63 to the winding of cut-off relay 620, thereby locking cut-off relay 620 in the operated position independent of the ground from armature 613 of line relay 610 before line relay 610 has had sufficient time to restore. As soon as line relay 610 restores, resistor 609 is directly connected to the winding of cut-off relay 620 through the resting contact of armature 611. At armature 612, line relay 610 completes the chain circuit to resistor 609 for all the other line circuits. The restoration of line relay 610 does not remove trigger device 618 from its position between the lower arm of armature 626 and the left-hand end of plate 619, as armature 626 firmly holds trigger device 618 against the left-hand end of plate 619 to retain left-hand vertical members 661, 662 and 663 in contact with conductors 61, 62 and 63 of trunk 1.

Digressing for the moment from the description of the call from line 1, an explanation will now be given of the method of automatically pre-assigning trunks to successive calls initiated at local stations of Figure 6. In the foregoing description it was stated that vertical bar 634 is associated with trunk 1, and vertical bar 644 with trunk 10. Bar 634 is controlled by lever 632, and bar 644 by lever 642. Lever 632 is controlled by cam 631, and lever 642 by cam 641. The cams are mounted on a common shaft 646 which is operative by electromagnet 630 through the medium of armature pawl 639. Lever 632 is pivoted at 633 and, consequently, when the left-hand end of lever 632 permitted bar 634 to drop by gravity to its lower position, the right-hand end of lever 632 closed contact 635 and opened contact 636. The seizing of the connector (not shown) associated with trunk 1 by line 1 caused ground potential to be extended to conductor 63 of trunk 1 in the manner previously described, and contact 635, therefore completes a multiple circuit to relay 615 and electromagnet 630, causing both relay 615 and electromagnet 630 to operate. At armature 616, relay 615 opens the multiple operating circuit for the cut-off relays of Figure 6 thereby to prevent the operation of any cut-off relay of Figure 6 should another outgoing call be initiated at this time.

The operation of electromagnet 630 causes armature pawl 639 to advance shaft 646 one trunk step in a clockwise direction. Cam 631, therefore, leaves the right-hand end of lever 632, and the tensioned springs associated with contacts 635 and 636 cause lever 632 to raise bar 634 to the upper, or normal, position, contact 635 to open, and contact 636 to close. The opening of contact 635 opens the circuit to relay 615 and electromagnet 630. Electromagnet 630 restores immediately but relay 615 is of the slow-to-release type. Pawl 637 retains shaft 646 in the advanced position. Contact 636 has no function at this time. The raising of bar 634 has no effect on the established connection of line 1 with trunk 1 as cut-off relay 620 continues to hold plate 619 to the right thereby maintaining left-hand vertical members 661, 662 and 663 in firm contact with conductors 61, 62 and 63 of trunk 1. The raising of bar 634, however, causes left-hand vertical members 671, 672 and 673 to be returned to their original, or normal, positions in which positions the lower ends of these vertical members are above the horizontal plane of the top ends of the left-hand vertical arms of plate 657 and, therefore, no subsequent movement of plate 657 to the right can cause the extension of line 50 to conductors 61, 62 and 63 of occupied trunk 1.

As the operation of armature pawl 639 stepped cam 631 away from lever 632, it also caused cam 641 to approach and operate the right-hand end of lever 642 associated with trunk 10, thereby causing contact 645 to be closed. Assuming now that trunk 10 is in the idle position, then the left-hand end of lever 642 causes bar 644 to drop by gravity to its lower position, thereby pre-assigning trunk 10 in a manner similar to that previously described in connection with the pre-assignment of trunk 1. If, however, trunk 10 is occupied at the time contact 645 is closed, the multiple circuit to relay 615 and electromagnet 630 will be completed, causing electromagnet 630 to operate and retaining relay 615 in the operated position. Relay 615 is slow to release and, therefore, did not restore when its circuit was opened at contact 635 before its circuit is completed at contact 645. The function of relay 615 is to maintain the multiple operating circuit to the cut-off relays of Figure 6 open while an idle trunk is being found and pre-assigned, in order that no calling line will be extended to an occupied trunk.

The re-operation of electromagnet 630 due to trunk 10 being found in the busy condition causes armature pawl 639 to advance shaft 646 another trunk step which in the normal event would select trunk 9 (not shown in detail). Occupied trunk 10 is thus by-passed and contact 645 opened. If trunk 9 is in the idle position, then there will be no ground potential to complete the multiple circuit to electromagnet 630 and relay 615, and trunk 9 is then pre-assigned in readiness for the next outgoing call on a line circuit of Figure 6. In the manner just described occupied trunks are by-passed and trunks in the idle position are pre-assigned.

Returning now to the connection of line 1 with the connector (not shown) associated with trunk 1, as previously stated the ground on trunk conductor 63 from the connector (not shown) is extended through the left-hand vertical member 663 to the winding of cut-off relay 620 and to the C terminal of the connector bank terminals of line 1. The ground on the winding of cut-off relay 620 causes cut-off relay 620 to maintain the connection of line 1 with trunk 1 as long as the direct-current loop of line A remains intact. The ground to the C terminal of the connector terminals of line 1 guards line 1 from intrusion by other calls.

Assuming further that line 1 desires a connection with line 50, then line 1 controls the connector (not shown) associated with trunk 1 in a well-known manner to cause the connector to connect with the bank terminals of line 50. The connector tests the C bank terminal of line 50 for a possible busy condition and finding line 50 in the idle position then connects ground potential to the winding of cut-off relay 650 by way of conductors 677, 673, 614, winding of cut-off relay 650, resting contact of armatures 628, conductor 605, resistor 609 to battery. Cut-off relay 650 operates over the circuit just traced and, at armatures 651 and 652, clears line 50 of attachments. Since armature 653 is shunted by armature 607, the chain circuit through this line circuit is not opened at this time. The operation of cut-off relay 650 also causes armature 656 to operate but armature 656 cannot cause a movement of plate 657 to the right because the lower arm of armature 656 just reaches the left-hand end of plate 657. The connector (not shown) of trunk 1 now automatically signals line 50 in a well-known manner, and when line 50 answers the call the signalling circuit is disconnected and a transmission circuit is established between lines 1 and 50 in a well-known manner.

Upon the termination of the conversation and the opening of the direct-current loop of line 1, the connector (not shown) of trunk 1 is restored to normal in a well-known manner, thereby causing the removal of ground potential from conductors 663 and 614. The removal of ground potential from conductor 663 causes cut-off relay 620 to restore and reconnect line relay 610 across the conductors of line 1 at armatures 621 and 622. The restoration of cut-off relay 620 also causes armature 626 to restore thereby permitting trigger device 618 to drop to its normal lower position and also permitting plate 619 to move to the left under the power of tensioned spring 627. The restoring of plate 619 causes the disconnection of left-hand vertical members 661, 662 and 663 from conductors 61, 62 and 63 of trunk 1, and the disconnected left-hand vertical members 661, 662 and 663 are then restored to their original, or normal, positions in the manner described in the previously mentioned application in order that their lower ends may be raised above the horizontal plane of the top ends of the left-hand vertical arms of plate 619. The removal of ground potential from conductor 614 causes cut-off relay 650 to restore and reconnect line relay 640 across the conductors of line 50 at armatures 651 and 652. Trunk 1 is now in the idle position.

The call from line 1 (Figure 6) just described was extended over the individual trunk (trunk 1) of the trunks accessible to lines 1—50. Additional outgoing calls from this group of lines will be extended over the common trunks in rotation as long as trunk 1 remains occupied. However, in order to obtain the maximum benefit of graded trunking, it is essential to route originating traffic to trunk 1 whenever trunk 1 becomes idle even though a common trunk was pre-assigned in response to trunk 1 becoming occupied and, therefore, means are included in Figure 6 to disable the pre-assignment of the common trunk and cause trunk 1 to be pre-assigned immediately trunk 1 becomes idle. The manner in which trunk 1 is again pre-assigned is described in the following paragraph.

During the period trunk 1 is occupied, relay 680 is held operated by the ground potential on trunk conductor 63, and as soon as trunk 1 becomes idle the ground potential is removed from conductor 63 thereby causing relay 680 to restore. At armature 681, relay 680 completes a multiple circuit to relay 615 and electromagnet 630 from ground, armature 681, contact 636 (closed when trunk 1 is in the idle position), interrupter armature 638, winding of relay 615 to battery, and from ground, armature 681, contact 636, interrupter armature 638, winding of electromagnet 630 to battery causing both relay 615 and electromagnet 630 to operate. At armature 616, relay 615 opens the multiple operating circuit for the cut-off relays of Figure 6 thereby to prevent the extension of a possible outgoing call to a trunk while trunk 1 is being pre-assigned. The operation of electromagnet 630 causes armature pawl 639 to advance shaft 646 one trunk step thereby causing the return of the previously pre-assigned common trunk (which will be assumed to be trunk 10) to the normal idle position. The operation of electromagnet 630 also causes interrupter armature 638 to open the multiple circuit to the windings of electromagnet 630 and relay 615. Electromagnet 630 restores but relay 615 remains operated due to its slow-to-release nature. Pawl 637 retains shaft 646 in the advanced position. The restoration of interrupter armature 638 completes the multiple operating circuit to electromagnet 630 and relay 615, causing electromagnet 630 to re-operate and relay 615 to remain operated. The re-operation of electromagnet 630 causes armature pawl 639 to advance shaft 646 another trunk step and also causes interrupter armature 638 to again open the multiple operating circuit to the windings of electromagnet 630 and relay 615. Electromagnet 630 accordingly restores and again causes the completion of the multiple operating circuit at restored interrupter armature 638. This alternate action of the operation and restoration of electromagnet 630 causing shaft 646 to be advanced one trunk step at a time continues until cam 631 reaches and raises the right-hand end of lever 632. The raising of the right-hand end of lever 632 causes the opening of contact 636 which in turn opens the multiple operating circuit to electromagnet 630 and relay 615, thereby preventing further advancing of shaft 646 and causing the re-establishment of the multiple operating circuit for the cut-off relays of Figure 6. The lowering of the left-hand end of lever 632 causes the pre-assignment of trunk 1 in the manner already described.

The operation of the lines and trunks shown in Figure 7 is the same as that just described for the lines and trunks of Figure 6 with the general exceptions that trunk 11 is the individual trunk instead of trunk 1, and that the lines are numbered 51 and 100 instead of 1 and 50. It is, therefore, considered unnecessary to describe the operation of Figure 7.

Having described the invention, what is considered new and is desired to have protected by Letters Patent is pointed out in the following claims.

What is claimed is:

1. In a telephone system, lines having line and cut-off relays, said lines adapted for initiating outgoing calls simultaneously; said line and cut-off relays each having a normally closed contact, an incomplete chain circuit connected through said contacts of said cut-off relays for controlling the operation of said cut-off relays, said contacts of said line relays shunting said contacts of said cut-off relays thereby rendering said contacts of said cut-off relays normally ineffective, means responsive to the initiation of an outgoing call on one of said lines for causing the line relay of said one line to operate and open its said contact thereby to remove said shunt from said contact of the cut-off relay of said one line and thus cause said contact of said one cut-off relay to become effective, said operation of said one line relay completing said incomplete chain circuit through said one cut-off relay thereby to cause the operation of said one cut-off relay, said operation of said one cut-off relay causing the opening of said completed chain circuit thereby to prevent the operation of any of said other cut-off relays should one or more additional outgoing calls be initiated at this time.

2. The telephone system as claimed in claim 1 and including means independent of said opened chain circuit for causing the operation of any one of said other cut-off relays when an incoming call is received for the line associated with said last cut-off relay.

3. In a telephone system, a plurality of lines, three relays individual to one of said lines, one of said relays connected to said one line, a trunk, connecting means individual to each of said lines, means responsive to the initiation of a call over said one line for operating said one relay, means controlled by said one operated relay for operating a second one of said relays, means for retaining said second relay in the operated position independent of said means controlled by said one operated relay, responsive to said operation of said second relay for operating said connecting means individual to said one line to connect said one line with said trunk, and means controlled by said operated second relay for causing the operation of third one of said relays to disable said means controlled by said one operated relay.

4. The telephone system as claimed in claim 3 together with a circuit controlled by said one operated relay to lock said operated third relay in the operated position, contacts on said operated second relay effective to disconnect said one operated relay from said line thereby to cause the restoration of said one operated relay, contacts on said one restored relay effective to cause the restoration of said operated third relay.

5. In a telephone system, a plurality of lines, a line relay and a cut-off relay individual to one of said lines, a plurality of trunks, means for selecting an idle one of said trunks, connecting means, conditioning means, a source of power, means responsive to the initiation of a call over said one line for causing said line relay to operate, means responsive to said operation of said line relay for interposing said conditioning means between said cut-off relay and said connecting means to condition said cut-off relay preparatory to causing the operation of said connecting means, said operation of said line relay extending said source to said conditioned cut-off relay to cause the operation of said conditioned cut-off relay, and means responsive to said operation of said conditioned cut-off relay for operating said connecting means to connect said one line with said one selected idle trunk.

6. In a telephone system as claimed in claim 5 wherein said last mentioned means also retains said interposed conditioning means independent of said interposing means controlled by said operated line relay, and wherein contacts on said operated cut-off relay operated to disable said operated line relay.

7. In a telephone system, a plurality of lines, a line relay and a cut-off relay individual to one of said lines, a plurality of trunks, means common to said trunks for causing the interconnection of preselected ones of said trunks and said one line, means for preselecting an idle one of said trunks, means responsive to the initiation of a call over said one line for operating said line relay, means responsive to said operation of said line relay for preparing said cut-off relay to operate said common connecting means, means responsive to said operation of said line relay for seizing said one pre-selected trunk, means responsive to said seizure of said one preselected trunk for causing said prepared cut-off relay to operate said common connecting means, and means responsive to said operation of said common connecting means for interconnecting said one seized preselected trunk and said one line.

8. In a telephone system, a plurality of lines each having a line relay and a cut-off relay, said lines adapted for initiating calls simultaneously, said line relays having means in common for preventing any two of said line relays operating at one time should calls be initiated over the related lines simultaneously, a plurality of trunks, connecting means individual to each of said cut-off relays for causing the interconnection of preselected idle ones of sai dtrunks and the related lines of said cut-off relays, means for preselecting an idle one of said trunks, means including said means in common for causing the operation of the line relay of one of said lines in response to the initiation of a call over said one line, means responsive to said operation of said one line relay for disabling said means in common to prevent any of said other line relays operating at this time, means responsive to said operation of said one line relay for preparing the cut-off relay of said one line to operate its individual connecting means, means responsive to said operation of said one line relay for seizing said one preselected trunk, means responsive to said seizure of said one preselected trunk for causing said one prepared cut-off relay of said one line to operate the connecting means individual to said one prepared cut-off relay, means responsive to said operation of said connecting means individual to said one operated cut-off relay for connecting said seized preselected trunk and said one line together, contacts on said one operated cut-off relay operated to disable said one operated line relay, contacts on responsive said one disabled line relay operated to re-establish said means in common.

9. In a telephone system, lines having line and cut-off relays, said lines adapted for initiating outgoing calls simultaneously said line and cut-off relays each having a normally closed contact, an incomplete chain circuit connected through said contacts of said cut-off relays, said contacts of said line relays shunting said contacts of said cut-off relays, means responsive to the simultaneous initiation of outgoing calls on two of said lines for causing the line relays of said two lines to operate and respectively open their said contacts, thereby to respectively remove said shunts from said contacts of the cut-off relays of said two lines, the operated line relay of one of said lines having other contacts operated to complete said incomplete chain circuit through the cut-off relay of said one line to cause the operation of said cut-off relay of said one line, said operation of said cut-off relay of said one line opening its said contact to disable said chain circuit thereby to prevent the operation of the cut-off relay of said other line at this time, means independent of said chain circuit locking said operated cut-off relay of said one line in the operated position, of said operated cut-off relay of said one line having other contacts operated to cause said operated line relay of said one line to restore, said restoration of said operated line relay of said one line closing its opened contact to partly re-establish said disabled chain circuit, the operated line relay of said other line having other contacts operated to complete said partly re-established chain circuit through the cut-off relay of said other line to cause the operation of said cut-off relay of said other line.

10. In a telephone system, lines each having a line relay, commons means controllable by any of said line relays for preventing the operation of more than one of said line relays at one time when calls are initiated over more than one of said lines simultaneously, means including said common means for causing the operation of the line relay of a certain one of said lines responsive to the initiation of a call over said one certain line, means responsive to said operation of said line relay of said one certain line for disabling said common means to prevent any of said other line relays operating at this time, means for causing said one operated line relay to restore, contacts on said one restored relay operated to re-establish said disabled common means, means including said re-established common means for causing the operation of another one of said line relays in response to the initiation of a call over the line related to said other line relay, means responsive to said operation of said other line relay for disabling said re-established common means, and means for causing said one restored line relay to re-operate independent of said last disabled common means.

11. In an automatic telephone system, lines each having an A relay, a B relay, and a C relay, and means for transmitting pulses common means controllable by any of said A relays for preventing the simultaneous operation of more than one of said A relays when calls are initiated over more than one of said lines at the same time, means including said common means for operating the A relay of one of said lines responsive to the initiation of a call over said one line, means responsive to said operation of said one A relay for disabling said common means to prevent any of said other A relays operating at this time, means controlled by said one operated A relay for causing the B relay of said one line to operate, means controlled by said one operated B relay for operating the C relay of said one line, contacts on said one operated B relay operated to cause said one operated A relay to restore, means for re-establishing said disabled common means controlled by said one restored A relay, means including said re-established common means for operating the A relay of another of said lines responsive to the initiation of a call over said other line, means for disabling said re-established common means responsive to said operation of said A relay of said other line, means controlled by said one operated C relay for partly preparing an operating circuit independent of said disabled re-established common means for said one restored A relay, means effective after the expiration of a predetermined time interval and before a pulse is received over said one line to cause the restoration of said one operated B relay, means controlled by said one restored B relay for completing said partly prepared operating circuit of said one restored A relay to cause the re-operation of said one restored A relay, and means controlled by said one reoperated A relay for locking said one operated C relay in the operated position to maintain said one re-operated A relay in the operated position.

12. The automatic telephone system as claimed in claim 11 together with means responsive to the abandonment of said call initiated over said one line for causing the restoration of said one re-operated A relay, and means controlled by said one re-operated A relay for disabling said one locked C relay.

13. In a telephone system, two groups of lines, trunks, one of said trunks accessible to the lines of only one of said groups, others of said trunks accessible in common to the lines of both said groups, means for pre-assigning said one trunk in preparation for seizure by any one of the lines of only said one group, means responsive to the initiation of a call over one of the lines of said one group for seizing said one pre-assigned trunk, means responsive to said seizure of said one pre-assigned trunk for connecting said one line of said one group with said one seized trunk, said first mentioned means responsive to said connection of said one line of said one group pre-assigning one of said common trunks in preparation for seizure by another of the lines of said one group or by one of the lines of said other group, means responsive to the abandonment of said connection of said one line of said one group with said one seized trunk for releasing said one seized trunk, means responsive to said releasing of said one seized trunk for disabling said pre-assignment of said one common trunk, said first mentioned means responsive to said disablement of said pre-assignment of said one common trunk pre-assigning said one released trunk in preparation for seizure by any one of the lines of only said one group.

14. In a telephone system, lines having line relays and cut-off relays, two trunks, means for pre-assigning one of said trunks, connecting means individual to each of said cut-off relays, means responsive to the initiation of a call over one of said lines for operating the line relay of said one line, means responsive to said operation of said one line relay for preparing the cut-off relay of said one line to operate the connecting means individual to said one cut-off relay, means controlled by said one operated line relay for causing said one prepared cut-off relay to operate said one connecting means, said operation of said one connecting means connecting said one pre-assigned trunk and said one line together, said first mentioned means responsive to said connection of said one line pre-assigning said other trunk in preparation for seizure by another of said lines, means responsive to said one line terminating said connection of said one line for releasing said one connected trunk, means responsive to said releasing of said one connected trunk for disabling said pre-assignment of said other trunk, said first mentioned means responsive to said disablement of said pre-assignment of said other trunk pre-assigning said one released trunk in preparation for seizure by any one of said lines.

15. In a telephone system, a line having a line relay and a cut-off relay, said line relay connected to said line, a trunk, connecting means, means responsive to the initiation of a call over said line for operating said line relay, means responsive to said operation of said line relay for preparing said cut-off relay to operate said connecting means, means responsive to said operation of said line relay for seizing said trunk, means responsive to said seizure of said trunk for causing said prepared cut-off relay to operate, means controlled by said operations of said line relay and said cut-off relay for temporarily holding said operated cut-off relay in the operated position, means responsive to said operation of said cut-off relay for operating said connecting means, means responsive to said operation of said connecting means for connecting said trunk and said line together, means controlled by said connection of said seized trunk and said line for locking said operated cut-off relay in the operated position independent of control by said holding means, means controlled by said operated cut-off relay for disconnecting said operated line relay from said line to cause the restoration of said operated line relay, said contacts on said restored line relay operated to disable said holding means.

ROY W. JONES.

REFERENCES CITED

The following references are of record in the file of this patent:

UNITED STATES PATENTS

| Number | Name | Date |
|---|---|---|
| 1,484,771 | Goodrum | Feb. 26, 1924 |
| 1,540,419 | Powell | June 2, 1925 |